United States Patent [19]

Long, Jr.

[11] 4,422,204

[45] Dec. 27, 1983

[54] APPARATUS FOR CLEANING A DIPSTICK

[76] Inventor: Arvin R. Long, Jr., 4334 Rock Creek Rd., Alexandria, Va. 22306

[21] Appl. No.: 403,000

[22] Filed: Jul. 29, 1982

[51] Int. Cl.³ .......................................... F01M 11/12
[52] U.S. Cl. .............................................. 15/210 B
[58] Field of Search ............ 15/210 R, 210 B, 218.1, 15/244 R, 246

[56] References Cited

U.S. PATENT DOCUMENTS 3,387,314  6/1968  Shirk .................................. 15/210 B Primary Examiner—Edward L. Roberts
Attorney, Agent, or Firm—Oblon, Fisher, Spivak, McClelland & Maier

[57] ABSTRACT

Disclosed is an apparatus for selectively cleaning a crankcase dipstick as it is withdrawn from the crankcase. The apparatus includes a pair of wiper lips, a spring biasing the wiper lips apart, a pair of handles for manually manipulating the wiper lips together, and an absorbent member positioned beneath the wiper lips for catching drops of oil wiped off the dipstick.

7 Claims, 4 Drawing Figures

APPARATUS FOR CLEANING A DIPSTICK

FIELD OF THE INVENTION

This invention relates to apparatus for selectively cleaning a crankcase dipstick as it is withdrawn from the crankcase.

BACKGROUND OF THE INVENTION

Various devices are known for selectively cleaning crankcase dipsticks as they are withdrawn from crankcases. However, those known to me suffer from at least two drawbacks. First, they are all fairly complicated devices and thus both expensive to manufacture and prone to failure. Second, they lack means for dealing with the oil wiped off the dipsticks other than simply allowing it to drain back into the crankcase.

OBJECTS OF THE INVENTION

It is, therefore, the general object of the invention to provide apparatus for selectively cleaning a crankcase dipstick as it is withdrawn from the crankcase which overcomes or ameliorates the drawbacks of the prior art.

It is a further object of the invention to provide such apparatus which is inexpensive to manufacture and sturdy in use. It is another object of the invention to provide such apparatus which includes a replaceable absorbent member sized and positioned to catch most of the oil which drips off the wiper lips.

Other objects and advantages of the invention will become apparent from the description of the preferred embodiment thereof given hereinafter.

SUMMARY OF THE INVENTION

Apparatus according to the invention includes a pair of wiper lips, means for biasing the wiper lips apart, means for manually manipulating the wiper lips together, and an absorbent member positioned beneath the wiper lips for catching drops of oil wiped off the dipstick.

DETAILED DESCRIPTION OF THE PRESENTLY PREFERRED EMBODIMENT

The drawings show the presently preferred embodiment of my apparatus 10 releasably mounted on a conventional dipstick pipe 12 and receiving a dipstick 14 therein. As will be apparent, the dipstick 14 differs from the dipstick which would be used in the absence of my apparatus in that its blade is increased in length by an amount equal to the height of my apparatus.

Figure 2:
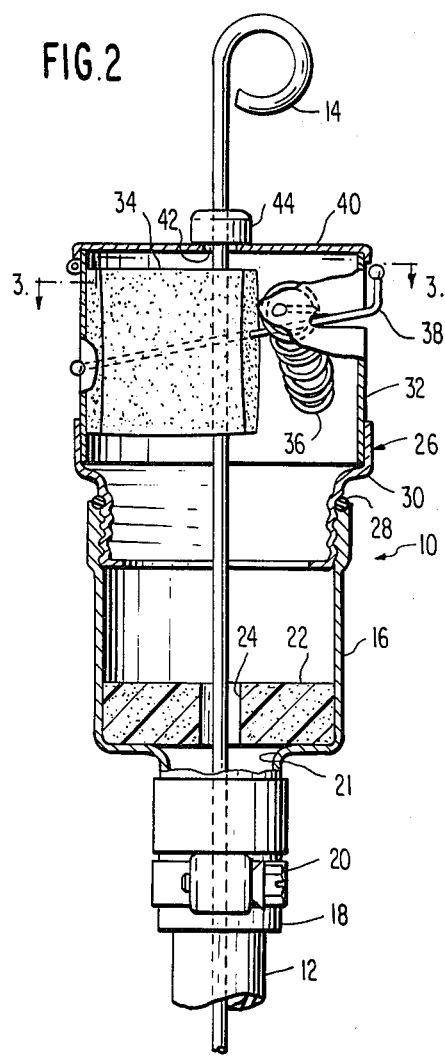
FIG. 2 is a view along the line 2—2 in FIG. 1.
Figure 1:
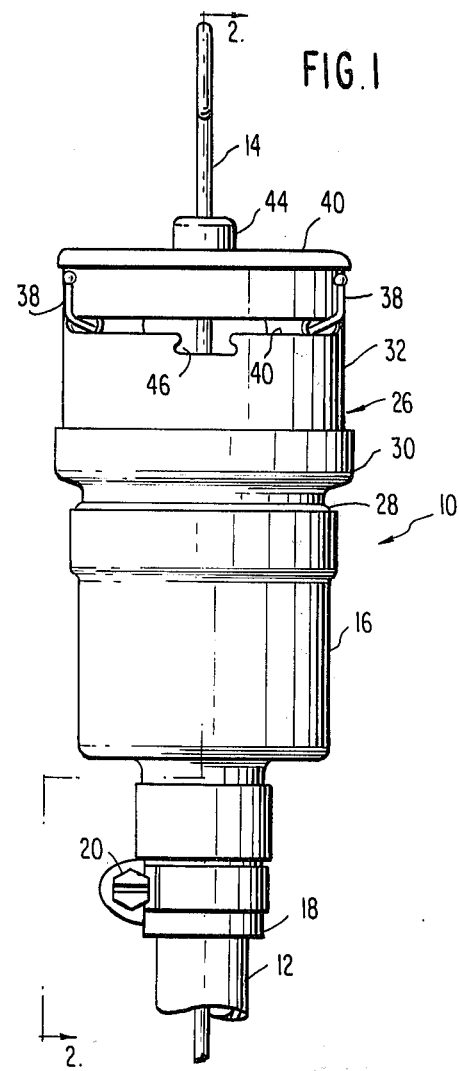
FIG. 1 is a side view of apparatus according to the invention releasably mounted on a conventional dipstick pipe.

As shown in FIGS. 1 and 2, a cup-shaped member 16 is releasably mounted over the dipstick receiving orifice of the dipstick pipe 12. (In a situation where there is no dipstick pipe as such, such as on some stationary engines, the dipstick receiving orifice may be directly on the crankcase, but the principle is the same.) In the illustrated embodiment, a cylindrical mounted member 18 which fits over the dipstick pipe 12 is provided at the bottom of the cup-shaped member 16, longitudinal slots are provided in the walls of the cylindrical mounting member 18 to permit it to be distorted slightly as it goes over the dipstick pipe 12, and a ring-clamp 20 is provided to tighten the cylindrical mounting member 18 in place. However, it will be appreciated that many other mounting strategems could be employed, including integral fabrication where the apparatus is provided as original equipment. An opening 21 is provided in the bottom of the cup-shaped member 16 positioned to act as a continuation of the dipstick receiving orifice in the dipstick pipe 12 and sized to pass the dipstick 14.

An absorbent member 22 is removably placed in the bottom of the cup-shaped member 16 in position to catch drops of oil wiped off the dipstick 14. The absorbent member 22 has an opening 24 therethrough sized and positioned to closely receive the dipstick 14 but to allow the dipstick 14 to pass therethrough.

A hollow cylindrical member 26 is releasably mounted on the cup-shaped member 16 so that the interior of the hollow cylindrical member 26 constitutes a continuation of the interior of the cup-shaped member 16. In the illustrated embodiment, an O-ring 28 is provided to seal the interface between the hollow cylindrical member 26 and the cup-shaped member 16, and the hollow cylindrical member 26 is fabricated in two parts—a lower part 30 which is threadedly received in the cup-shaped member 16 and an upper part 32 which is received in and soldered to the lower part 26. However, the hollow cylindrical member could be fabricated integrally, and it could be releasably mounted on the cup-shaped member 16 by means other than threads.

Figure 3:
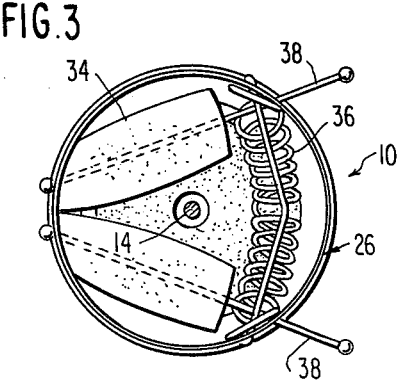
FIG. 3 is a view along the line 3—3 in FIG. 2, showing the wiper lips in their spaced apart position.
Figure 4:
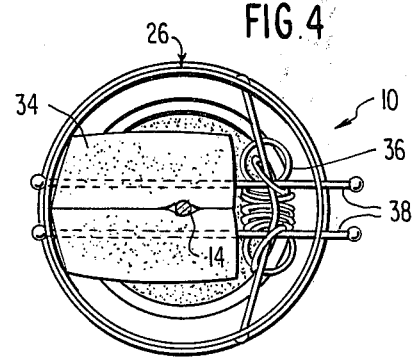
FIG. 4 is a view similar to FIG. 3, but showing the wiper lips in their pressed together position.

A pair of wiper lips 34 fabricated from an absorbent material (e.g., sponge) are mounted in the hollow cylindrical manner 26. A compression spring 36 is operatively connected to the wiper lips 34 so as to bias them towards a position (shown in FIG. 3) in which the dipstick 14 can be passed between the wiper lips 34 without contacting them. Each of the wiper lips 34 is carried by one of a pair of handles 38 which extend through a slot 40 in the wall of the hollow cylindrical member 26. The compression spring 36 bears at each end against the handles 38, and, as shown in FIG. 3, the handles diverge outwardly from one another when the wiper lips 34 are positioned so as to pass the dipstick 14. However, the handles 38 can be manipulated manually to bring the wiper lips 34 into the position (shown in FIG. 4) in which they contact the dipstick 14.

A cap 40 is pivotably mounted over the top opening of the hollow cylindrical member 26. The cap 40 has an opening 42 therein sized and positioned to permit the dipstick 14 to pass through while the portion of the cap 40 surrounding the opening acts as an abutment surface for a stop 44 on the dipstick 14.

As shown in FIG. 1, the slot 40 communicates with a shorter parallel slot 46 which acts as detent for selectively holding the wiper lips 34 in position to contact the dipstick. Thus, the wiper lips 34 can be secured in this position while both hands are free for other tasks.

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

I claim:

1. Apparatus for cleaning a dipstick, said apparatus comprising:
   (a) a cup-shaped member adapted to be mounted over the dipstick receiving orifice of a crankcase, said cup-shaped member having an opening in the bottom thereof positioned to act as a continuation of the dipstick receiving orifice and sized to pass the dipstick;
   (b) an absorbent member removably placed in the bottom of said cup-shaped member, said absorbent member having an opening therethrough sized and positioned to closely receive the dipstick but to allow the dipstick to pass therethrough;
   (c) a hollow cylindrical member releasably mounted on said cup-shaped member so that the interior of said hollow cylindrical member constitutes a continuation of the interior of said cup-shaped member;
   (d) a pair of wiper lips fabricated from an absorbent material mounted in said hollow cylindrical member;
   (e) first means for biasing said wiper lips towards a position in which the dipstick can be passed therebetween without contacting said wiper lips;
   (f) second means for moving said wiper lips against the bias of said first means into a position in which they will contact and wipe the dipstick as it is passed therebetween; and
   (g) a cap mounted over the top opening of said hollow cylindrical member, said cap having an opening therein sized and positioned to permit the dipstick to pass through while the portion of said cap surrounding the opening acts as an abutment surface for the dipstick stop.

2. Apparatus as recited in claim 1 wherein said first means comprises a compression spring.

3. Apparatus as recited in claim 1 wherein said second means comprises a pair of handles each of which carries one of said wiper lips, said handles extending through a slot in the wall of said hollow cylindrical member, whereby said handles can be manipulated manually to bring said wiper lips into position to contact the dipstick.

4. Apparatus as recited in claim 3 wherein said handles diverge outwardly from one another when said wiper lips are positioned so as to pass the dipstick.

5. Apparatus as recited in claim 1 and further comprising a detent means for selectively holding said wiper lips in position to contact the dipstick.

6. Apparatus as recited in claim 1 wherein said cap is pivotably mounted on said hollow cylindrical member.

7. Apparatus as recited in claim 1 wherein said cup-shaped member is adapted to be releasably mounted over the dipstick receiving orifice of a crankcase.

* * * * *